(12) United States Patent
Ishikawa et al.

(10) Patent No.: US 8,755,979 B2
(45) Date of Patent: Jun. 17, 2014

(54) SAFETY CONTROL APPARATUS FOR AUTOMATIC TRANSMISSION AND METHOD FOR CONTROLLING AUTOMATIC TRANSMISSION

(71) Applicant: Honda Motor Co., Ltd., Tokyo (JP)

(72) Inventors: Yutaka Ishikawa, Wako (JP); Nobuyuki Watanabe, Wako (JP); Kazuhiko Imamura, Wako (JP); Ryuichi Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/787,817

(22) Filed: Mar. 7, 2013

(65) Prior Publication Data

US 2013/0261913 A1 Oct. 3, 2013

(30) Foreign Application Priority Data

Mar. 30, 2012 (JP) ................................ 2012-079780

(51) Int. Cl.
*F16H 59/72* (2006.01)
*F16H 61/10* (2006.01)
*B60W 10/06* (2006.01)
*B60W 50/00* (2006.01)

(52) U.S. Cl.
USPC .......................................................... 701/51

(58) Field of Classification Search
None
See application file for complete search history.

(56) References Cited

U.S. PATENT DOCUMENTS 8,548,701 B2 10/2013 Tsukamoto et al.
2010/0010716 A1* 1/2010 Sawada et al. ................... 701/52

FOREIGN PATENT DOCUMENTS

| JP | 02-217660 | | 8/1990 | | |
| JP | 02217660 A | * | 8/1990 | ............. | F16H 61/10 |
| JP | 2007-170620 | * | 5/2007 | ............. | F16H 61/10 |
| JP | 2009-281511 | * | 12/2009 | ............. | F16H 59/72 |
| JP | 2010-090956 | * | 4/2010 | ............. | F16H 61/12 |

OTHER PUBLICATIONS

Japanese Office Action for corresponding JP Application No. 2012-079780, Oct. 1, 2013.

* cited by examiner

*Primary Examiner* — John R Olszewski
*Assistant Examiner* — Jess Whittington
(74) *Attorney, Agent, or Firm* — Ditthavong Mori & Steiner, P.C.

(57) ABSTRACT

A safety control apparatus for an automatic transmission includes a speed range detector, an oil temperature detector, a vehicle speed detector, a speed-range shifting device, a shift inhibiting device, and a maximum-speed limiting device. The shift inhibiting device is configured to inhibit an automatic downshift and a manual downshift by a driver if the speed-range shifting device performs a forcible upshift. The maximum-speed limiting device is configured to limit a maximum vehicle speed to a third vehicle speed if an oil temperature reaches a second oil temperature which is higher than a first oil temperature and if a vehicle speed is not lower than a second vehicle speed which is higher than a first vehicle speed.

11 Claims, 7 Drawing Sheets

SAFETY CONTROL APPARATUS FOR AUTOMATIC TRANSMISSION AND METHOD FOR CONTROLLING AUTOMATIC TRANSMISSION

CROSS-REFERENCE TO RELATED APPLICATIONS

The present application claims priority under 35 U.S.C. §119 to Japanese Patent Application No. 2012-079780, filed Mar. 30, 2012, entitled "Safety control apparatus for Automatic Transmission." The contents of this application are incorporated herein by reference in their entirety.

BACKGROUND OF THE INVENTION

1. Field of the Invention

The present disclosure relates to a safety control apparatus for an automatic transmission and a method for controlling the automatic transmission.

2. Discussion of the Background

Japanese Unexamined Patent Application Publication No. 2009-281511 discloses a control device for an automatic transmission. The device performs an automatic upshift of the speed range when the oil temperature of the automatic transmission increases and reaches a certain temperature and inhibits a downshift from the speed range into which the transmission is upshifted in order to prevent the oil temperature from increasing. After the oil temperature is reduced by performing the upshift or inhibiting the downshift, the device allows a downshift when predetermined driving conditions are satisfied. For example, the conditions include: the degree of the throttle opening is at a predetermined degree or lower and the vehicle speed is at a predetermined speed or lower; and the engine speed is at a predetermined speed or lower.

SUMMARY OF THE INVENTION

According to one aspect of the present invention, a safety control apparatus for an automatic transmission includes a speed range detector, an oil temperature detector, a vehicle speed detector, a speed-range shifting device, a shift inhibiting device, and a maximum-speed limiting device. The speed range detector is configured to detect a current speed range of the automatic transmission. The oil temperature detector is configured to detect an oil temperature of the automatic transmission. The vehicle speed detector is configured to detect a vehicle speed. The speed-range shifting device is configured to perform a forcible upshift from the current speed range if the vehicle speed is not lower than a first vehicle speed and if the oil temperature is not lower than a first oil temperature. The shift inhibiting device is configured to inhibit an automatic downshift and a manual downshift by a driver if the speed-range shifting device performs the forcible upshift. The maximum-speed limiting device is configured to limit a maximum vehicle speed to a third vehicle speed if the oil temperature reaches a second oil temperature which is higher than the first oil temperature and if the vehicle speed is not lower than a second vehicle speed which is higher than the first vehicle speed.

According to another aspect of the present invention, in a method for controlling an automatic transmission, a current speed range of the automatic transmission, an oil temperature of the automatic transmission, and a vehicle speed are detected. A forcible upshift is performed from the current speed range if the vehicle speed is not lower than a first vehicle speed and if the oil temperature is not lower than a first oil temperature. An automatic downshift and a manual downshift by a driver are inhibited if the speed-range shifting means performs the forcible upshift. A maximum vehicle speed is limited to a third vehicle speed if the oil temperature reaches a second oil temperature which is higher than the first oil temperature and if the vehicle speed is not lower than a second vehicle speed which is higher than the first vehicle speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Referring now to FIGS. 1 to 7, an embodiment of the present application will be described.

Figure 1:
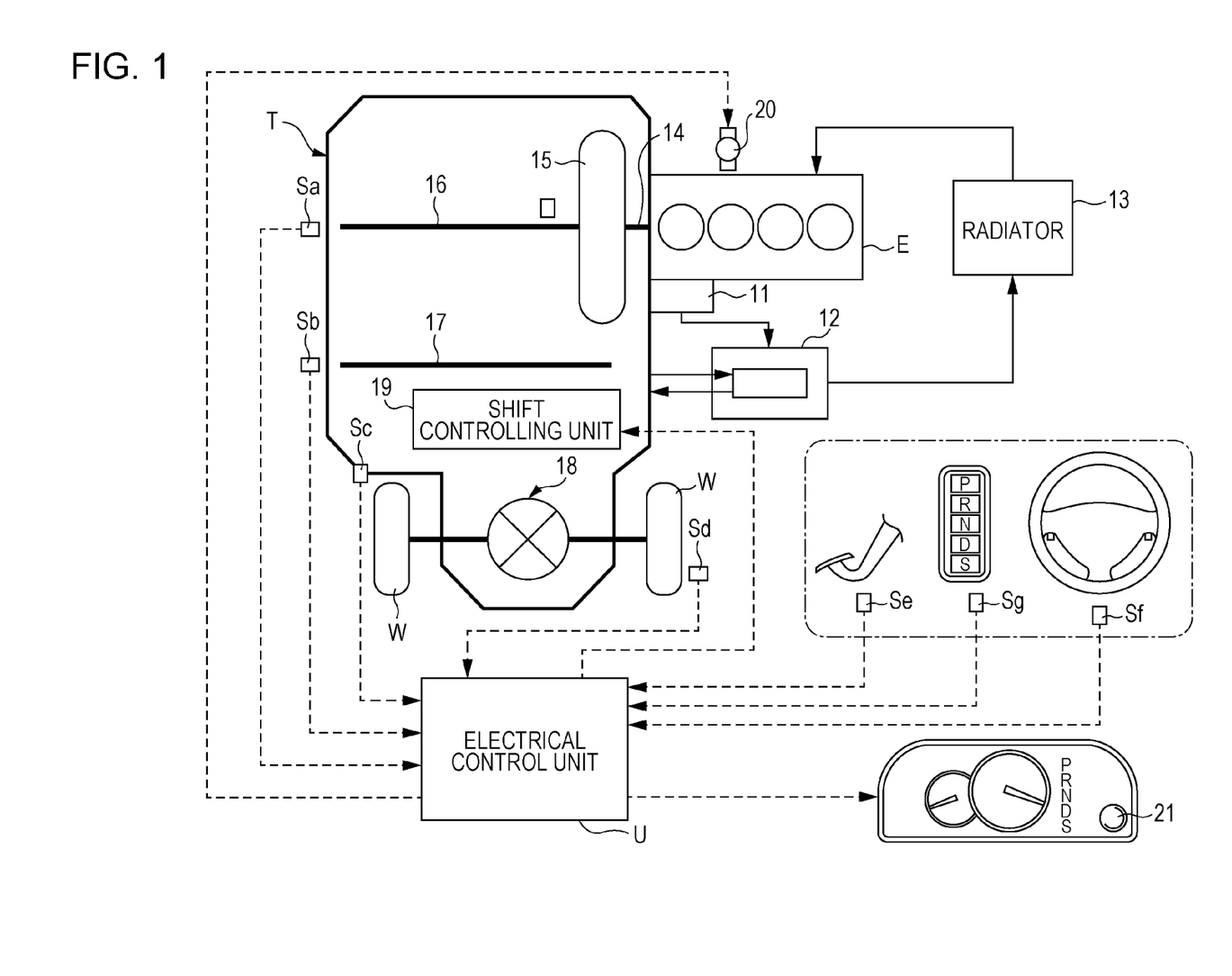
FIG. 1 illustrates an entire configuration of a vehicle on which a safety control apparatus for an automatic transmission is mounted.

As illustrated in FIG. 1, a vehicle according to an embodiment includes, for example, an automatic transmission T with six forward speed ranges. Cooling water for an engine E pumped up by a cooling water pump 11 passes through an oil cooler 12, at which the cooling water cools oil in the automatic transmission T, a radiator 13, at which the cooling water exchanges heat with air, and a water jacket, at which the cooling water cools the engine E. The automatic transmission T includes a main shaft 16, a counter shaft 17, and a differential gear 18. The main shaft 16 is connected to a crankshaft 14 of the engine E via a torque converter 15. The counter shaft 17 is connected to the main shaft 16 via multiple hydraulic clutches and a gear train. The differential gear 18 is connected to the counter shaft 17 and left and right driving wheels W.

A main-shaft-rpm detector Sa, a counter-shaft-rpm detector Sb, an oil temperature detector Sc, and a vehicle speed detector Sd are connected to an electronic control unit U that performs safety control of the automatic transmission T for preventing the oil temperature of the automatic transmission T from excessively increasing. The main-shaft-rpm detector Sa detects the number of revolutions per minute of the main shaft 16. The counter-shaft-rpm detector Sb detects the number of revolutions per minute of the counter shaft 17. The oil temperature detector Sc detects the oil temperature of the automatic transmission T. The vehicle speed detector Sd detects the vehicle speed based on the rotational speed of the driving wheels W. Since the gear ratio of the automatic transmission T is calculated as being the number of revolutions per minute of the main shaft 16 divided by the number of revolutions per minute of the counter shaft 17, the main-shaft-rpm detector Sa and the counter-shaft-rpm detector Sb serve as a gear ratio detector. The electronic control unit U is also connected with a throttle opening detector Se, a paddle operation detector Sf, a shift position detector Sg, and an oil-temperature warning light 21. The throttle opening detector Se, the paddle operation detector Sf, and the shift position detector Sg are used to detect driver's intention to accelerate. The throttle opening detector Se detects the degree of opening of the throttle. The paddle operation detector Sf detects an operation on a shift paddle mounted on a steering wheel. The shift position detector Sg detects the shift position selected by using a shift selector. The oil-temperature warning light 21 alarms the driver.

The electronic control unit U prevents the oil temperature of the automatic transmission T from excessively increasing by controlling operations of a shift controlling unit 19, which controls shifting of the automatic transmission T, and operations of an electronically controlled throttle valve 20, which controls the output of the engine E, on the basis of signals from the detectors Sa to Sg. The electronic control unit U also notifies the driver of an increase in the oil temperature by turning on and off the oil-temperature warning light 21.

Figure 2:
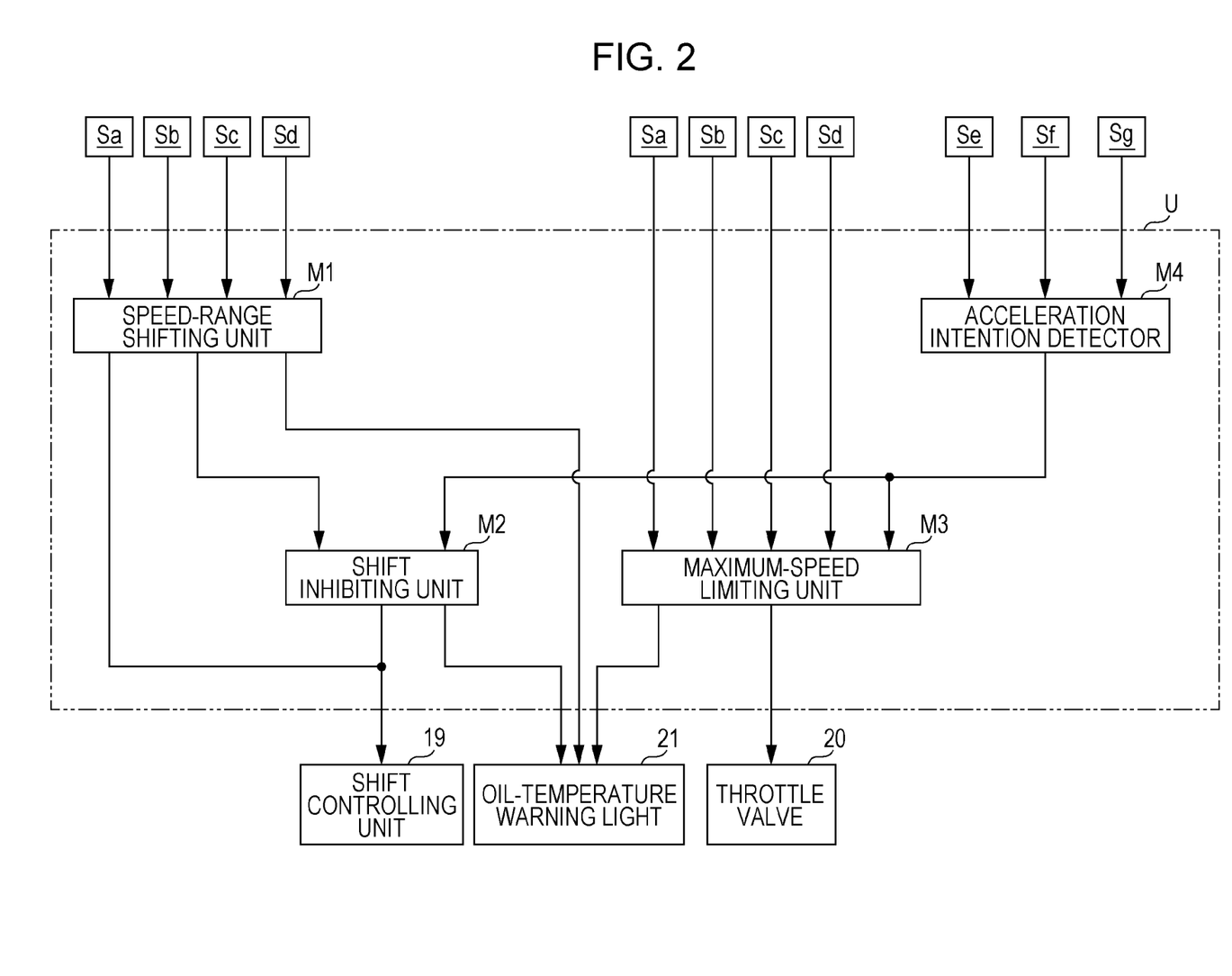
FIG. 2 is a block diagram of a circuit configuration of an electronic control unit.

As illustrated in FIG. 2, the electronic control unit U includes a speed-range shifting unit M1, a shift inhibiting unit M2, a maximum-speed limiting unit M3, and an acceleration intention detector M4.

The speed-range shifting unit M1 is connected to the main-shaft-rpm detector Sa, the counter-shaft-rpm detector Sb, the oil temperature detector Sc, and the vehicle speed detector Sd. When the oil temperature of the automatic transmission T is excessively increased, the speed-range shifting unit M2 performs a forcible upshift by controlling the operations of the shift controlling unit 19 of the automatic transmission T in order to reduce the oil temperature. When the speed-range shifting unit M1 has performed a forcible upshift, the shift inhibiting unit M2 inhibits a downshift from the speed range into which the transmission is upshifted to prevent the oil temperature of the automatic transmission T from increasing.

The maximum-speed limiting unit M3 is connected to the main-shaft-rpm detector Sa, the counter-shaft-rpm detector Sb, the oil temperature detector Sc, and the vehicle speed detector Sd. When the oil temperature keeps increasing while the highest speed range (sixth speed range), beyond which an upshift is not allowed to be performed, is current, the operation of the electronically controlled throttle valve 20 is controlled and the maximum vehicle speed is limited, so that the oil temperature of the automatic transmission T is prevented from increasing.

The speed-range shifting unit M1, the shift inhibiting unit M2, and the maximum-speed limiting unit M3 are also connected to the oil-temperature warning light 21. While safety control of the automatic transmission T is performed, the oil-temperature warning light 21 is kept on to notify the driver that the safety control is being performed.

The acceleration intention detector M4 is connected to the throttle opening detector Se, the paddle operation detector Sf, and the shift position detector Sg. The acceleration intention detector M4 determines whether the driver intends to accelerate or not. The shift inhibiting unit M2 is allowed to stop inhibiting a downshift or the maximum-speed limiting unit M3 is allowed to stop limiting the maximum vehicle speed only when the acceleration intention detector M4 determines that the driver intends to accelerate. Thus, the use of the acceleration intention detector M4 prevents the driver from feeling uncomfortable with an unexpected downshift or acceleration.

Figure 3:
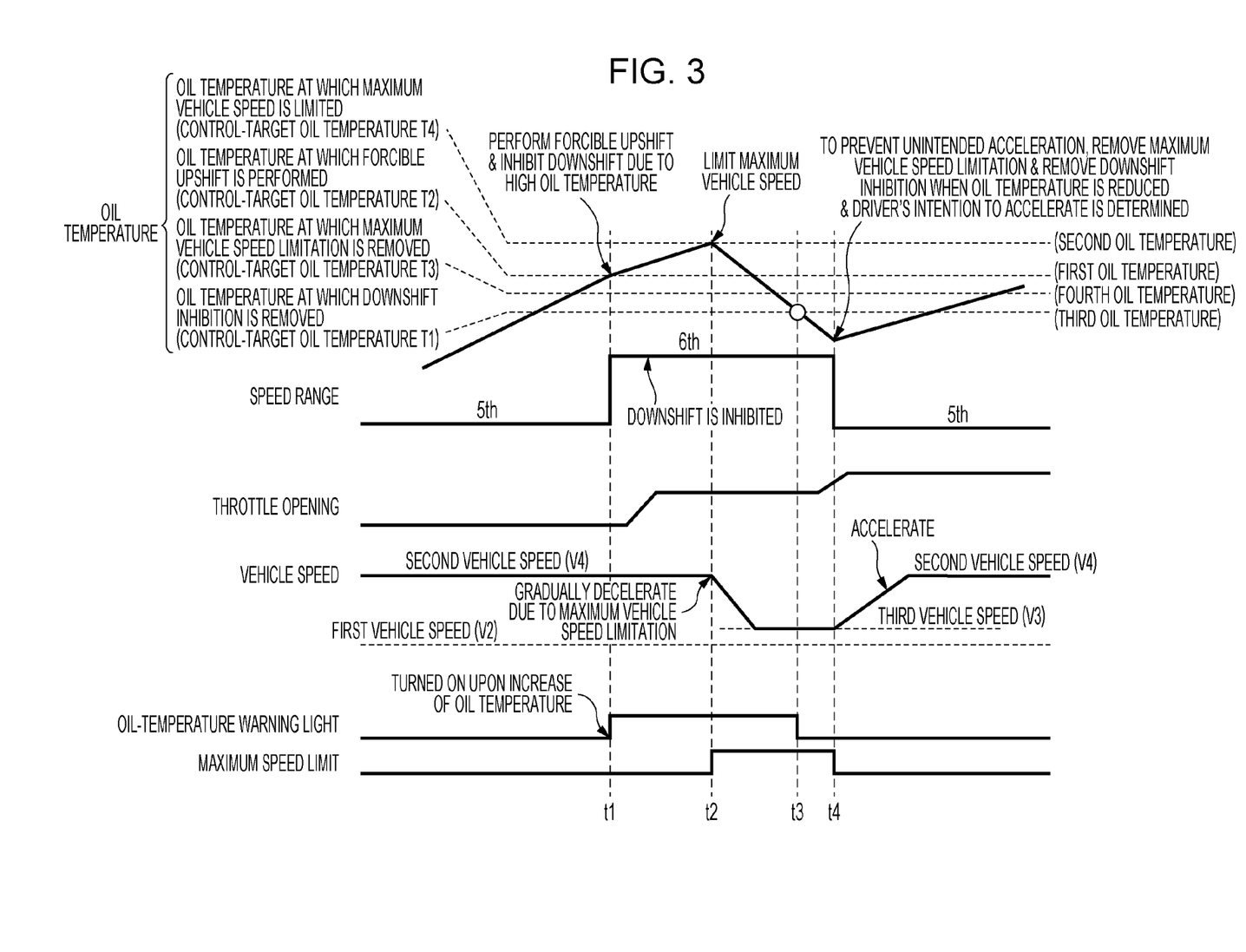
FIG. 3 is a timing chart of the case where an accelerator pedal is pressed after a forcible upshift is performed.

Referring now to the timing chart of FIG. 3, an example of safety control of the automatic transmission T performed by the electronic control unit U will be described. The example of FIG. 3 illustrates the case where the driver presses the accelerator pedal after a forcible upshift is performed when the oil temperature increases and reaches a certain temperature.

While the vehicle including the automatic transmission T that is in the fifth speed range is travelling at a fourth vehicle speed limit V4, if the oil temperature of the automatic transmission T increases and reaches or exceeds a second control-target oil temperature T2 (the oil temperature at which a forcible upshift is required) at a time point t1, the speed-range shifting unit M1 performs a forcible upshift from the current fifth speed range to the sixth speed range. Concurrently, the shift inhibiting unit M2 inhibits a downshift and the oil-temperature warning light 21 is turned on to warn the driver of an increase in the oil temperature. When an upshift is performed in the automatic transmission T, a smaller number of revolutions per minute are input to the automatic transmission T. Thus, the automatic transmission T produces a smaller amount of heat, thereby preventing an increase in the oil temperature.

If the driver further presses the accelerator pedal despite the oil-temperature warning light 21 being on, the oil temperature increases further despite the forcible upshift into the sixth speed range having been performed. When the oil temperature reaches or exceeds a fourth control-target oil temperature T4 (oil temperature at which the maximum vehicle speed needs to be limited) at a time point t2, a maximum vehicle speed starts being limited. Specifically, the electronically controlled throttle valve 20 is actuated and the output of the engine E is reduced to limit the maximum vehicle speed to a third vehicle speed limit V3, which is lower than a fourth vehicle speed limit V4 but higher than a first vehicle speed limit V1. Consequently, the oil temperature gradually decreases. When the oil temperature falls below a first control-target oil temperature T1 (oil temperature at which inhibition of a downshift is removed) at a time point t3, the oil-temperature warning light 21 is turned off. Thereafter, when the acceleration intention detector M4 determines that the driver intends to accelerate on the basis of the fact, for example, that the driver presses the accelerator pedal, the shift inhibiting unit M2 is allowed to stop inhibiting a downshift at a time point t4 and a downshift from the sixth speed range into the fifth speed range is performed in accordance with a shift map for automatic shift control. Concurrently, the maximum-speed limiting unit M3 stops limiting the maximum vehicle speed and the vehicle speed starts increasing.

Figure 4:
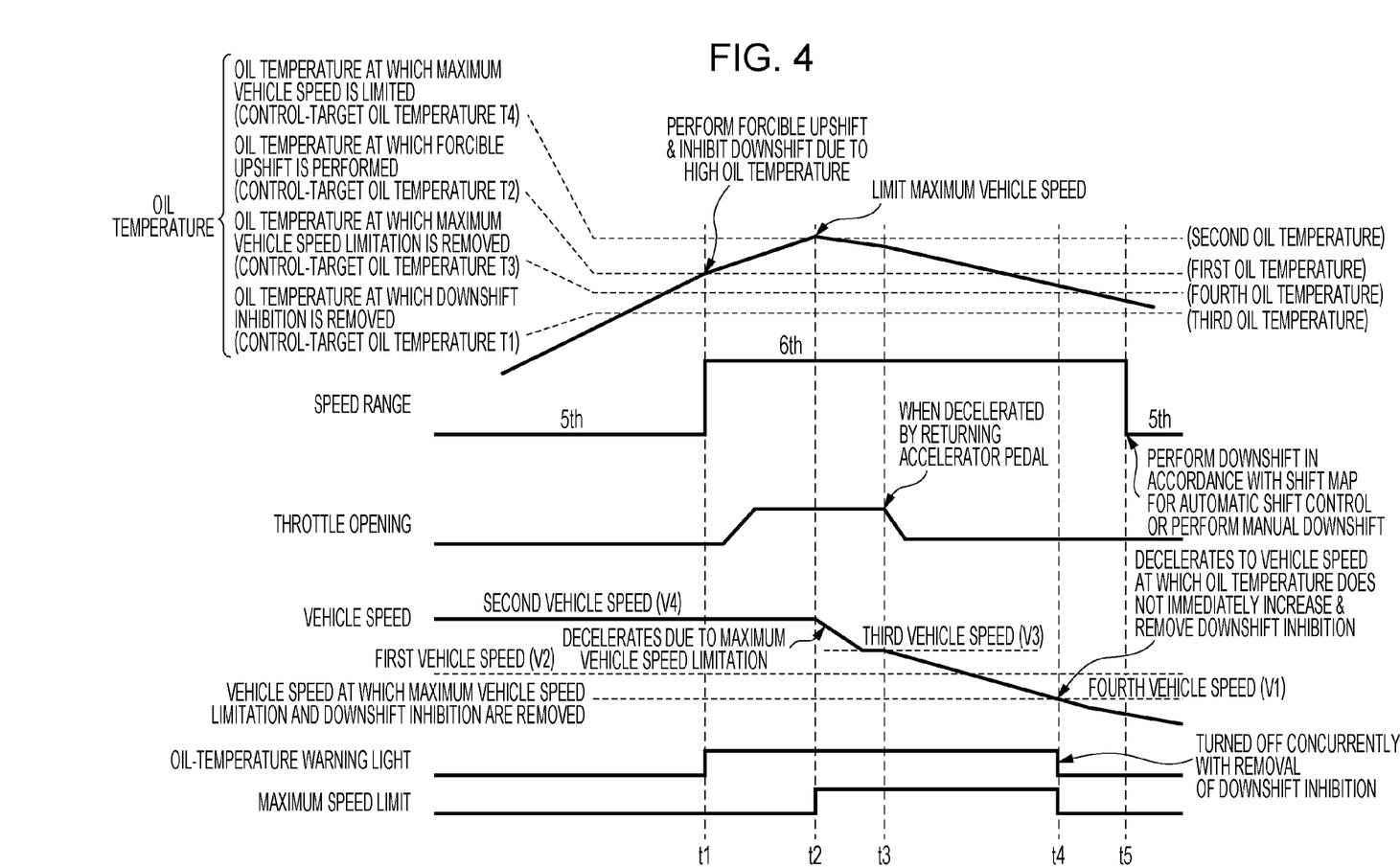
FIG. 4 is a timing chart of the case where the accelerator pedal is returned after the forcible upshift is performed.

An example of FIG. 4 illustrates the case where the driver returns the accelerator pedal without pressing the accelerator pedal after the forcible upshift is performed when the oil temperature increases and reaches a certain temperature.

The processing proceeds similarly to that illustrated in FIG. 3 until the time point t2. When the oil temperature reaches or exceeds a fourth control-target oil temperature T4 (oil temperature at which the maximum vehicle speed needs to be limited) at the time point t2, a maximum vehicle speed starts being limited, specifically, the electronically controlled throttle valve 20 is actuated and the output of the engine E is reduced to limit the maximum vehicle speed to the third vehicle speed limit V3. Subsequently, when the driver returns the accelerator pedal at the time point t3, the oil temperature and the vehicle speed are reduced further. When the vehicle speed falls below the first vehicle speed limit V1 at the time point t4, the limitation on the maximum vehicle speed and the inhibition of a downshift are removed and the oil-temperature warning light 21 is turned off. At a time point t5, a downshift from the sixth speed range into the fifth speed range is performed manually by the driver or performed in accordance with the shift map for automatic shift control.

Figure 5:
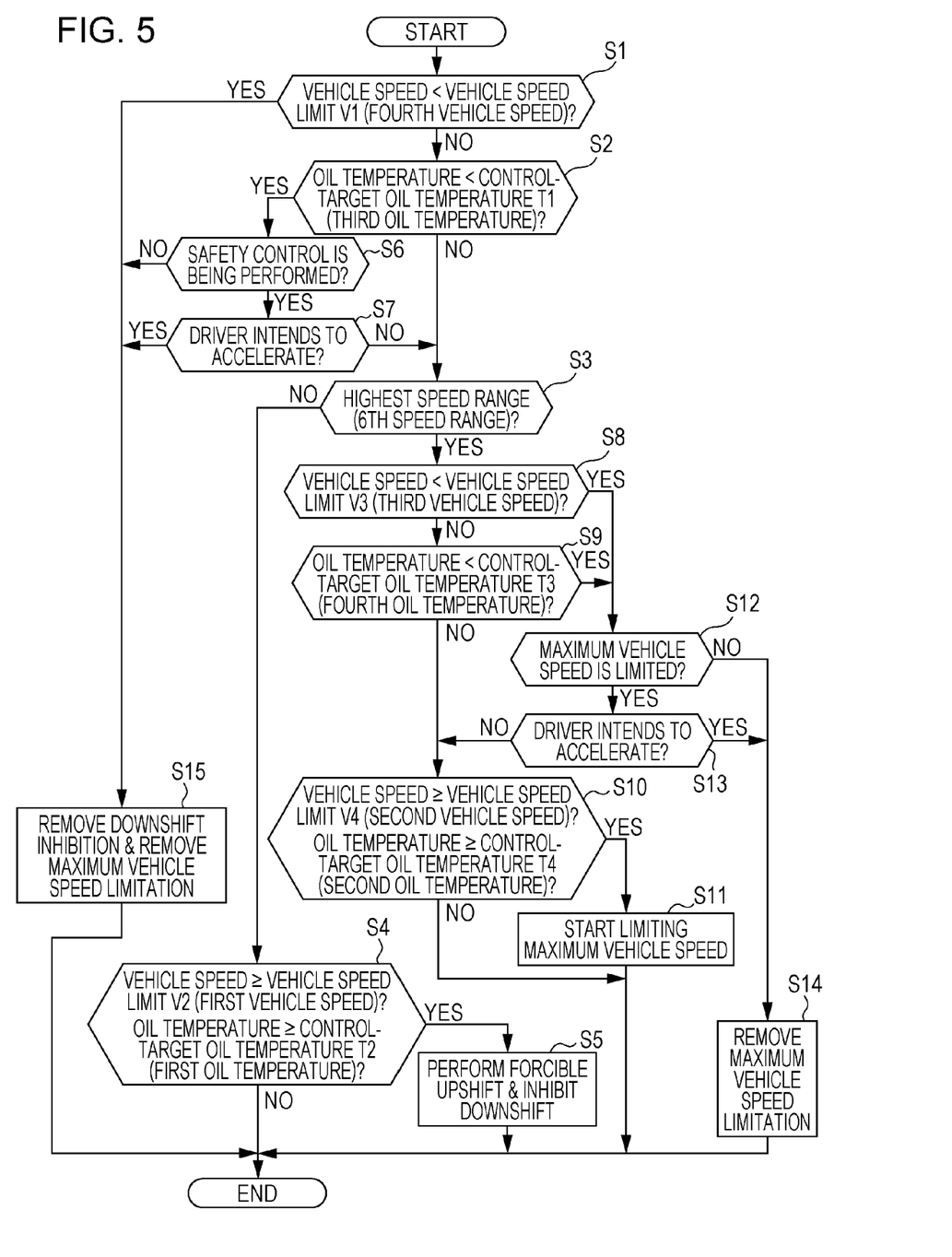
FIG. 5 is a flowchart of a routine for performing safety control of the automatic transmission.

Referring now to the flowchart of FIG. 5, the above-described operations are collectively described.

When the vehicle speed is the first vehicle speed limit V1 or higher in Step S1 (No in Step S1), the oil temperature is the first control-target oil temperature T1 or higher in Step S2 (No in Step S2), and the current speed range is not the highest speed range (sixth speed range) in Step S3 (No in Step S3), the processing proceeds to Step S4. Here, the first vehicle speed limit V1 is set for each speed range and the first vehicle speed limit V1 is higher for a higher speed range than for a lower speed range. When the vehicle speed is the second vehicle speed limit V2 or higher and the oil temperature is the second control-target oil temperature T2 or higher in Step S4 (Yes in Step S4), the automatic transmission T is determined as being excessively heated. Thus, in order to prevent further increase in the oil temperature, the safety control is performed in Step S5 in which the forcible upshift is performed and a downshift from the speed range into which the transmission is upshifted is inhibited. Here, the second vehicle speed limit V2 is set for each speed range and the second vehicle speed limit V2 is higher for a higher speed range than for a lower speed range.

When the current speed range is the highest speed range (sixth speed range) in Step S3 (Yes in Step S3), the vehicle speed is the third vehicle speed limit V3 or higher in Step S8 (No in Step S8), and the oil temperature is the third control-target oil temperature T3 or higher in Step S9 (No in Step S9), the processing proceeds to Step S10. When the vehicle speed is the fourth vehicle speed limit V4 or higher and the oil temperature is the fourth control-target oil temperature T4 or higher in Step S10 (Yes in Step S10), the automatic transmission T is determined as being excessively heated. Thus, in order to prevent further increase in the oil temperature, a maximum speed limitation control is performed in Step S11 in which the maximum vehicle speed is limited to the third vehicle speed limit V3.

When the vehicle speed is below the first vehicle speed limit V1 and the oil temperature is prevented from increasing in Step S1 (Yes in Step S1), the inhibition of a downshift and the limitation on the maximum vehicle speed are removed in Step S15. When the oil temperature is below the first control-target oil temperature T1 and the oil temperature is prevented from increasing in Step S2 (Yes in Step S2), if the safety control is not being performed in Step 6 (No in Step 6), the inhibition of a downshift and the limitation on the maximum vehicle speed are removed in Step S15. When the safety control is being performed in Step S6 (Yes in Step 6), if it is determined that the driver intends to accelerate in Step S7 (Yes in Step S7), the inhibition of a downshift and the limitation on the maximum vehicle speed are removed in Step S15. If it is determined that the driver does not intend to accelerate in Step S7 (No in Step S7), the processing proceeds to Step S3.

When the current speed range is the highest speed range (sixth speed range) in Step S3 (Yes in Step S3), if the vehicle speed is below the third vehicle speed limit V3 in Step S8 (Yes in Step S8) or if the vehicle speed is the third vehicle speed limit V3 or higher in Step S8 (No in Step S8) but the oil temperature is below the third control-target oil temperature T3 in Step S9 (Yes in Step S9), the processing proceeds to Step S12. If the maximum vehicle speed limitation control is not being performed in Step S12 (No in Step S12) or if the maximum vehicle speed limitation control is being performed in Step S12 (Yes in Step S12) but it is determined that the driver intends to accelerate in Step S13 (Yes in Step S13), the limitation on the maximum vehicle speed is removed in Step S14. When it is determined that the driver does not intend to accelerate in Step S13 (No in Step 13), the processing proceeds to Step S10.

After the safety control is finished, an upshift or a downshift for the current vehicle speed and the current degree of the throttle opening is appropriately performed in accordance with a normal shift map.

As described above, when the oil temperature of the automatic transmission T is increased as a result of high-speed driving by driving the engine E at a high value of revolutions per minute and at a high torque (see Step S4), a forcible upshift is performed and a downshift is inhibited (see Step S5). Consequently, a smaller number of revolutions per minute are input to the automatic transmission T to prevent heat generation and thus the oil temperature is prevented from increasing. If the oil temperature further increases even though the speed range has reached the highest speed range as a result of the forcible upshift (see Step S10), the maximum vehicle speed is limited by reducing the output of the engine E to reduce the oil temperature (see Sep S11).

The vehicle speed at which a forcible upshift is started and a downshift starts being inhibited is set for each speed range (see Step S4). Thus, a forcible upshift can be performed and a downshift can be inhibited appropriately for each speed range (see Step S5). The vehicle speed at which the inhibition of a downshift and the limitation on the maximum vehicle speed are removed is also set for each speed range (Step S1). Thus, the inhibition of a downshift and the limitation on the maximum vehicle speed can be removed appropriately for each speed range (see Step S15).

Figure 6:
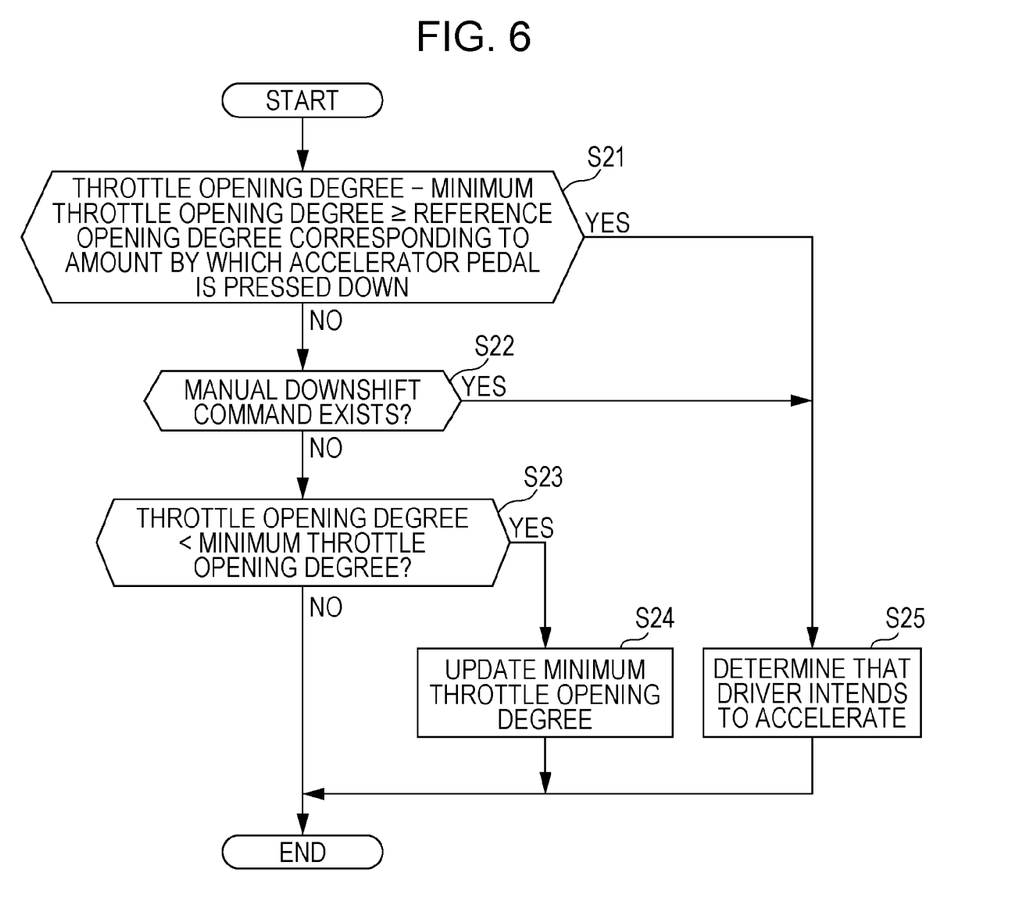
FIG. 6 is a flowchart of a routine for determining whether acceleration is intended or not.

Referring now to FIG. 6, a routine for determining whether the driver intends to accelerate or not, which is a subroutine of Step S7 and Step S13, is described.

When the deviation of the degree of the throttle opening detected by the throttle opening detector Se from a minimum degree of the throttle opening is not lower than a reference opening degree corresponding to the amount by which the accelerator pedal is pressed down (Yes in Step S21), it is determined in Step S25 that the driver intends to accelerate. The minimum degree of the throttle opening is a minimum size of the throttle opening at the time when the accelerator pedal is returned after the oil temperature falls below the first control-target oil temperature T1. The minimum degree of the throttle opening is updated every time when the accelerator pedal is returned. The reference opening degree corresponding to the amount by which the accelerator pedal is pressed down is set at, for example, 25% of the full throttle opening. Even when the deviation of the degree of the throttle opening from the minimum degree of the throttle opening falls below the reference opening degree corresponding to the amount by which the accelerator pedal is pressed down in Step S21, if the paddle operation detector Sf detects a manual downshift command issued by the driver's operation on the paddle in Step S22, it is determined in Step S25 that the driver intends to accelerate.

When the paddle operation detector Sf does not detect a manual downshift command issued by the driver's operation on the paddle in Step S22, the current degree of the throttle opening and the current minimum degree of the throttle opening are compared with each other in Step S23. When the current degree of the throttle opening is below the minimum degree of the throttle opening (Yes in Step S23), the current degree of the throttle opening is set as the minimum degree of the throttle opening in Step S24. Thus, the deviation of the degree of the throttle opening from the minimum degree of the throttle opening calculated in Step S21 is equivalent to the amount by which the driver has pressed down the accelerator pedal to accelerate the vehicle.

A downshift is performed when the conditions to remove the inhibition of a downshift and the limitation on the maximum vehicle speed are satisfied and when both the degree of the throttle opening detected in Step S21 and the vehicle speed during Step S21 satisfy conditions to perform a downshift specified in the shift map for automatic shift control based on the degree of the throttle opening and the vehicle speed. A downshift is also performed when conditions such as the vehicle speed and the engine speed at the time when the manual downshift command is detected in Step S22 are satisfied.

As described above, the safety control is stopped not immediately after the oil temperature or the vehicle speed is reduced by performing a forcible upshift or by limiting the maximum vehicle speed but after it is determined that the driver intends to accelerate. Thus, the driver is prevented from feeling uncomfortable with an unexpected downshift or acceleration.

While the maximum vehicle speed is limited, the vehicle does not accelerate despite the driver pressing down the accelerator pedal. In this case, the driver may not intend to accelerate even though the degree of the throttle opening is large. Thus, if it is determined that the driver intends to accelerate only because the degree of the throttle opening is large, the determination may be incorrect. In the embodiment, however, whether the driver intends to accelerate or not is determined not on the basis of the degree of the throttle opening but on the basis of the amount by which the driver presses down the accelerator pedal. Consequently, the embodiment can reliably prevent incorrect determination.

If the degree of the throttle opening is large and the driver performs a manual downshift, the driver obviously intends to accelerate. On the other hand, if the degree of the throttle opening is small and the driver performs a downshift, the driver intends to use engine braking. In either case, by stopping the safety control when the manual downshift is performed, the driver's intention to perform a downshift can be reflected on the speed range of the automatic transmission T.

By setting the first vehicle speed limit V1 and the second vehicle speed limit V2 in accordance with the speed range, the automatic transmission T can be prevented from being excessively heated and the driver's intention can be satisfied as much as possible.

In Step S22, whether or not the driver intends to accelerate is determined when the paddle operation detector Sf has detected a manual downshift command. In addition to or instead of this case, whether or not the driver intends to accelerate may be determined when the shift position detector Sg detects that the speed range is shifted from the "D" range to the "S" range or to the "L" range.

Figure 7:
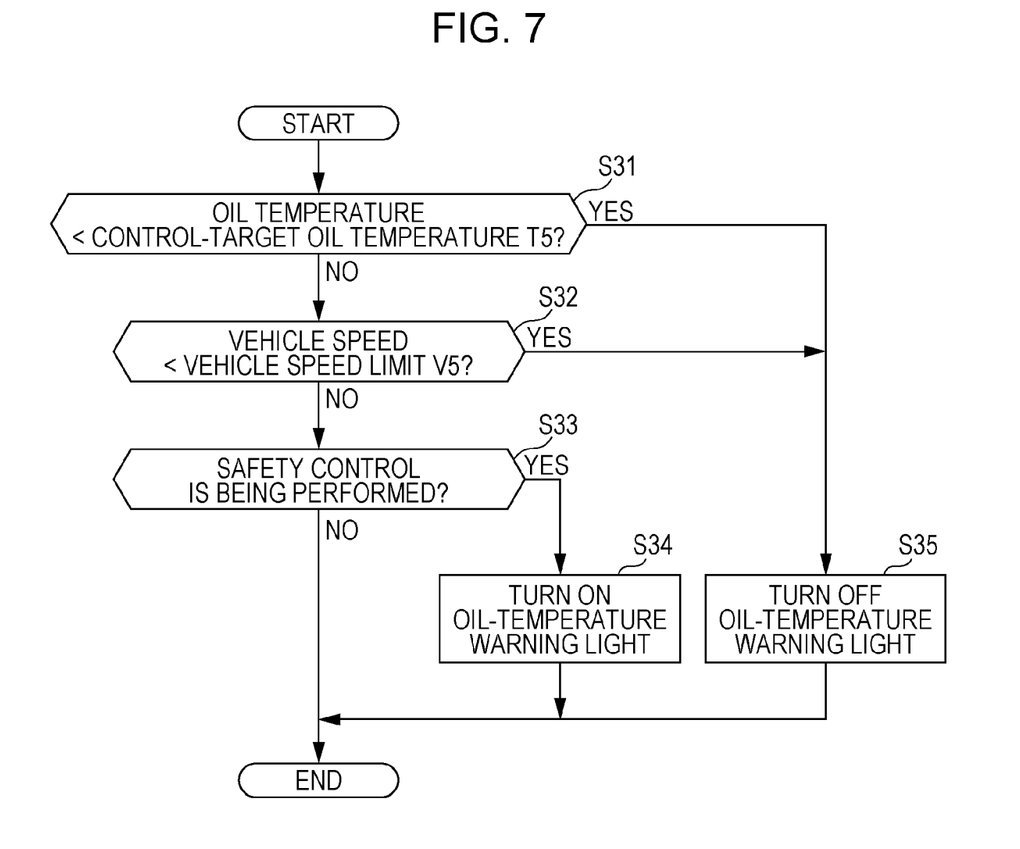
FIG. 7 is a flowchart of a routine for turning on or off an oil-temperature warning light.

Referring now to FIG. 7, a routine for turning on or off the oil-temperature warning light 21 will be described.

When the oil temperature is below the control-target oil temperature T5 in Step S31 (Yes in Step S31) or when the oil temperature is the control-target oil temperature T5 or higher in Step S31 (No in Step S31) but the vehicle speed is below the vehicle speed limit V5 in Step S32 (Yes in Step S32), the oil-temperature warning light 21 is turned off in Step S35. When the vehicle speed is the vehicle speed limit V5 or higher in Step S32 (No in Step S32) and the safety control is being performed in Step S33 (Yes in Step S33), that is, a downshift is inhibited and the maximum vehicle speed is limited, the oil-temperature warning light 21 is turned on in Step S34. For example, the control-target oil temperature T5 is the same as the first control-target oil temperature T1 and the vehicle speed limit V5 is the same as the first vehicle speed limit V1.

As described above, the oil-temperature warning light 21 is turned on concurrently with the start of the safety control to notify the driver that the safety control is being performed. Consequently, the driver can become aware that an upshift is automatically performed, a downshift is inhibited, or the maximum vehicle speed is limited as a safety control measure taken to handle the increase in the oil temperature. Unlike the existing technology with which the oil-temperature warning light 21 is turned on by taking only the oil temperature into consideration, the oil-temperature warning light 21 is turned on in response to the start of the safety control in the embodiment. Since the oil-temperature warning light 21 is turned on before the vehicle starts moving differently in accordance with the safety control, the driver does not feel uncomfortable with the different movement. In addition, since the oil-temperature warning light 21 is turned off when the oil temperature or the vehicle speed decreases, the driver can become aware that acceleration is made possible again.

In case the oil temperature detector Sc is broken, the safety control is performed on the assumption that the oil temperature reaches or exceeds the fourth control-target oil temperature T4, so that the oil temperature of the automatic transmission T can be prevented from excessively increasing.

The correspondence between the first to fourth control-target oil temperatures T1 to T4 according to the embodiment and first to fourth oil temperatures according to the present application and the relationship in size between the first to fourth control-target oil temperatures T1 to T4 are as follows.

first control-target oil temperature T1: third oil temperature
second control-target oil temperature T2: first oil temperature
third control-target oil temperature T3: fourth oil temperature
fourth control-target oil temperature T4: second oil temperature
T1<T3<T2<T4

The correspondence between the first to fourth vehicle speed limits V1 to V4 according to the embodiment and first to fourth vehicle speeds according to the present application and the relationship in size between first to fourth vehicle speed limits V1 to V4 are as follows. first vehicle speed limit V1: fourth vehicle speed
second vehicle speed limit V2: first vehicle speed
third vehicle speed limit V3: third vehicle speed
fourth vehicle speed limit V4: second vehicle speed
V1<V2<V3<V4

Although the embodiment of the present application has been described thus far, the present application can be designed in various different manners within the scope not departing from the gist of the present application.

For example, when the oil temperature increases during high-speed driving, the oil temperature can be reduced by performing an upshift. On the other hand, when the oil temperature increases during low-speed driving, the oil temperature has to be reduced by performing a downshift. This is because, during the low-speed driving, the oil temperature is more likely to increase with the oil of the automatic transmission T being roughly disturbed due to a large difference in rotation speed between the turbine runner and the pump impeller of the torque converter. If the difference in rotation speed between the turbine runner and the pump impeller of the torque converter is reduced by performing a downshift, the degree of agitation of the oil is reduced and thus the oil temperature is reduced.

In addition, whether or not the driver intends to accelerate may be determined when the driving mode is switched from the economy mode to the sport mode, or when the "D4" switch is turned on.

In a first aspect of the embodiment, a safety control apparatus for an automatic transmission includes a speed range detector that detects a speed range of the automatic transmission; an oil temperature detector that detects an oil temperature of the automatic transmission; a vehicle speed detector that detects a vehicle speed; a speed-range shifting unit that performs a forcible upshift from a current speed range when the vehicle speed is not lower than a first vehicle speed and the oil temperature is not lower than a first oil temperature; a shift inhibiting unit that inhibits an automatic downshift and a manual downshift by a driver when the speed-range shifting unit performs a forcible upshift; and a maximum-speed limiting unit that limits a maximum vehicle speed to a third vehicle speed when the oil temperature reaches a second oil temperature, which is higher than the first oil temperature, and the vehicle speed is not lower than a second vehicle speed, which is higher than the first vehicle speed.

According to the first aspect, the upshift can reduce the number of revolutions per minute input to the automatic transmission and prevent the oil temperature from increasing. The inhibition of a downshift can prevent the oil temperature from increasing again due to an increase in the number of revolutions per minute input to the automatic transmission. In addition, even when a forcible upshift cannot be performed to reduce the oil temperature because the current speed range is the highest speed range, the oil temperature can be prevented from increasing by limiting the maximum vehicle speed.

Preferably, the safety control apparatus according to the embodiment further includes an acceleration intention detector. The shift inhibiting unit stops inhibiting the automatic downshift and the manual downshift by the driver when the oil temperature falls below a third oil temperature, which is lower than the first oil temperature, and the acceleration intention detector determines that the driver intends to accelerate.

Thus, the driver can be prevented from feeling uncomfortable with an unexpected downshift despite the driver having no intention to accelerate.

Preferably, the maximum-speed limiting unit according to the embodiment stops limiting the maximum vehicle speed when the oil temperature falls below a fourth oil temperature, which is lower than the first oil temperature and higher than the third oil temperature, and the acceleration intention detector determines that the driver intends to accelerate.

Thus, the driver can be prevented from feeling uncomfortable with an unexpected increase in vehicle speed despite the driver having no intention to accelerate.

Preferably, in the safety control apparatus according to the embodiment, the shift inhibiting unit stops inhibiting the automatic downshift and the manual downshift by the driver and the maximum-speed limiting unit stops limiting the maximum vehicle speed when the vehicle speed falls below a fourth vehicle speed, which is lower than the first vehicle speed, even when the oil temperature is not lower than the third oil temperature.

Thus, the inhibition of the automatic downshift and the manual downshift and the limitation on the maximum vehicle speed can be appropriately removed when the vehicle speed is sufficiently low so that the oil temperature is prevented from increasing.

Preferably, in the safety control apparatus according to the embodiment, the first vehicle speed is set in accordance with the speed range.

Thus, the forcible upshift and the inhibition of the automatic downshift and the manual downshift can be performed appropriately for the current speed range.

Preferably, in the safety control apparatus according to the embodiment, the fourth vehicle speed is set in accordance with the speed range.

Thus, the inhibition of the automatic downshift and the manual downshift and the limitation on the maximum vehicle speed can be removed appropriately for the current speed range.

Obviously, numerous modifications and variations of the present invention are possible in light of the above teachings. It is therefore to be understood that within the scope of the appended claims, the invention may be practiced otherwise than as specifically described herein.

What is claimed is:

1. A safety control apparatus for an automatic transmission, the safety control apparatus comprising:
    a speed range detector configured to detect a current speed range of the automatic transmission;
    an oil temperature detector configured to detect an oil temperature of the automatic transmission;
    a vehicle speed detector configured to detect a vehicle speed;
    a speed-range shifting device configured to perform a forcible upshift from the current speed range if the vehicle speed is not lower than a first vehicle speed and if the oil temperature is not lower than a first oil temperature;
    a shift inhibiting device configured to inhibit an automatic downshift and a manual downshift by a driver if the speed-range shifting device performs the forcible upshift; and
    a maximum-speed limiting device configured to limit a maximum vehicle speed to a third vehicle speed if the oil temperature reaches a second oil temperature which is higher than the first oil temperature and if the vehicle speed is not lower than a second vehicle speed which is higher than the first vehicle speed.

2. The safety control apparatus according to claim 1, further comprising:
    an acceleration intention detector configured to determine whether the driver intends to accelerate or not,
    wherein the shift inhibiting device stops inhibiting the automatic downshift and the manual downshift by the driver if the oil temperature falls below a third oil temperature which is lower than the first oil temperature and if the acceleration intention detector determines that the driver intends to accelerate.

3. The safety control apparatus according to claim 2, wherein the maximum-speed limiting device stops limiting the maximum vehicle speed if the oil temperature falls below a fourth oil temperature which is lower than the first oil temperature and higher than the third oil temperature and if the acceleration intention detector determines that the driver intends to accelerate.

4. The safety control apparatus according to claim 2, wherein the shift inhibiting device stops inhibiting the automatic downshift and the manual downshift by the driver and the maximum-speed limiting device stops limiting the maximum vehicle speed if the vehicle speed falls below a fourth vehicle speed which is lower than the first vehicle speed, even if the oil temperature is not lower than the third oil temperature.

5. The safety control apparatus according to claim 2, further comprising:
a throttle opening detector configured to detect degree of a throttle opening,
wherein the acceleration intention detector determines that the driver intends to accelerate if deviation of the degree of the throttle opening detected by the throttle opening detector from a minimum degree of the throttle opening is not lower than a reference opening degree.

6. The safety control apparatus according to claim 5, wherein the minimum degree of the throttle opening is a minimum size of the throttle opening at a timing at which an accelerator pedal is returned after the oil temperature falls below the first oil temperature.

7. The safety control apparatus according to claim 1, wherein the first vehicle speed is set in accordance with each of speed ranges of the automatic transmission.

8. The safety control apparatus according to claim 4, wherein the fourth vehicle speed is set in accordance with each of speed ranges of the automatic transmission.

9. A safety control apparatus for an automatic transmission, the safety control apparatus comprising:
speed range detecting means for detecting a current speed range of the automatic transmission;
oil temperature detecting means for detecting an oil temperature of the automatic transmission;
vehicle speed detecting means for detecting a vehicle speed;
speed-range shifting means for performing a forcible upshift from the current speed range if the vehicle speed is not lower than a first vehicle speed and if the oil temperature is not lower than a first oil temperature;
shift inhibiting means for inhibiting an automatic downshift and a manual downshift by a driver if the speed-range shifting means performs the forcible upshift; and
maximum-speed limiting means for limiting a maximum vehicle speed to a third vehicle speed if the oil temperature reaches a second oil temperature which is higher than the first oil temperature and if the vehicle speed is not lower than a second vehicle speed which is higher than the first vehicle speed.

10. The safety control apparatus according to claim 1, wherein the third vehicle speed is lower than the second vehicle speed and is higher than the first vehicle speed.

11. A method for controlling an automatic transmission, the method comprising:
detecting a current speed range of the automatic transmission;
detecting an oil temperature of the automatic transmission;
detecting a vehicle speed;
performing a forcible upshift from the current speed range if the vehicle speed is not lower than a first vehicle speed and if the oil temperature is not lower than a first oil temperature;
inhibiting an automatic downshift and a manual downshift by a driver if the speed-range shifting means performs the forcible upshift; and
limiting a maximum vehicle speed to a third vehicle speed if the oil temperature reaches a second oil temperature which is higher than the first oil temperature and if the vehicle speed is not lower than a second vehicle speed which is higher than the first vehicle speed.

* * * * *